US012592111B2

(12) United States Patent
Zimmermann et al.

(10) Patent No.: US 12,592,111 B2
(45) **Date of Patent: *Mar. 31, 2026**

(54) ONE-WAY PASS-THROUGH SYSTEM WITH RETURN BLOCK FOR USE IN BUILDINGS, AND A CORRESPONDING BUILDING HAVING A ONE-WAY PASS-THROUGH SYSTEM OF THIS KIND

(71) Applicant: Assa Abloy Entrance Systems AB, Landskrona (SE)

(72) Inventors: Robert Zimmermann, Breisach (DE); Christoph Schmidt, Ettenhiem (DE); Anton Singler, Schuttertal (DE)

(73) Assignee: Assa Abloy Entrance Systems AB, Landskrona (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,816

(22) Filed: Jun. 7, 2024

(65) Prior Publication Data

US 2024/0331473 A1 Oct. 3, 2024

Related U.S. Application Data

(63) Continuation of application No. 17/312,159, filed as application No. PCT/EP2019/084282 on Dec. 9, 2019, now Pat. No. 12,039,816.

(30) Foreign Application Priority Data

Dec. 12, 2018 (DE) ........................ 202018107098.3

(51) Int. Cl.
*G07C 9/10* (2020.01)
*E05G 5/02* (2006.01)
*G07C 9/30* (2020.01)

(52) U.S. Cl.
CPC ................. *G07C 9/10* (2020.01); *G07C 9/30* (2020.01); *E05G 5/02* (2013.01); *E05Y 2400/822* (2013.01)

(58) Field of Classification Search
CPC .. G07C 9/30; G07C 9/10; E05G 5/003; E05G 5/02; E06B 11/085; E05Y 2400/822
See application file for complete search history.

(56) References Cited

U.S. PATENT DOCUMENTS 4,401,035 A 8/1983 Spigarelli et al.
6,308,644 B1 * 10/2001 Diaz ........................ E05G 5/003 109/6

(Continued)

FOREIGN PATENT DOCUMENTS

CA 2682764 A1 * 10/2008 ........... E04H 1/1205
CN 105023335 11/2015

(Continued)

OTHER PUBLICATIONS

Extended European Search Report in corresponding European Application No. 24172352.7 mailed Jul. 17, 2024. (14 pages).

(Continued)

*Primary Examiner* — Yong Hang Jiang
(74) *Attorney, Agent, or Firm* — Wissing Miller LLP

(57) ABSTRACT

A one-way passage system (1) comprises an entrance door arrangement (2*a*) and offset therefrom an exit door arrangement (2*b*). First and second side wall arrangements (3*a*, 3*b*) are provided therebetween, thereby defining a passage area (4). A sensor device (5) can detect persons (10): a) before the entrance door arrangement (2*a*); b) in the passage area (4) and/or after the exit door arrangement (2*b*). A control device is configured to enter a safety operating mode and to close the entrance door arrangement (2*a*) when an analysis of sensor data indicates that a person (10): a) in the passage area (4) goes back in the direction of the entrance door (Continued)

Figure 1:
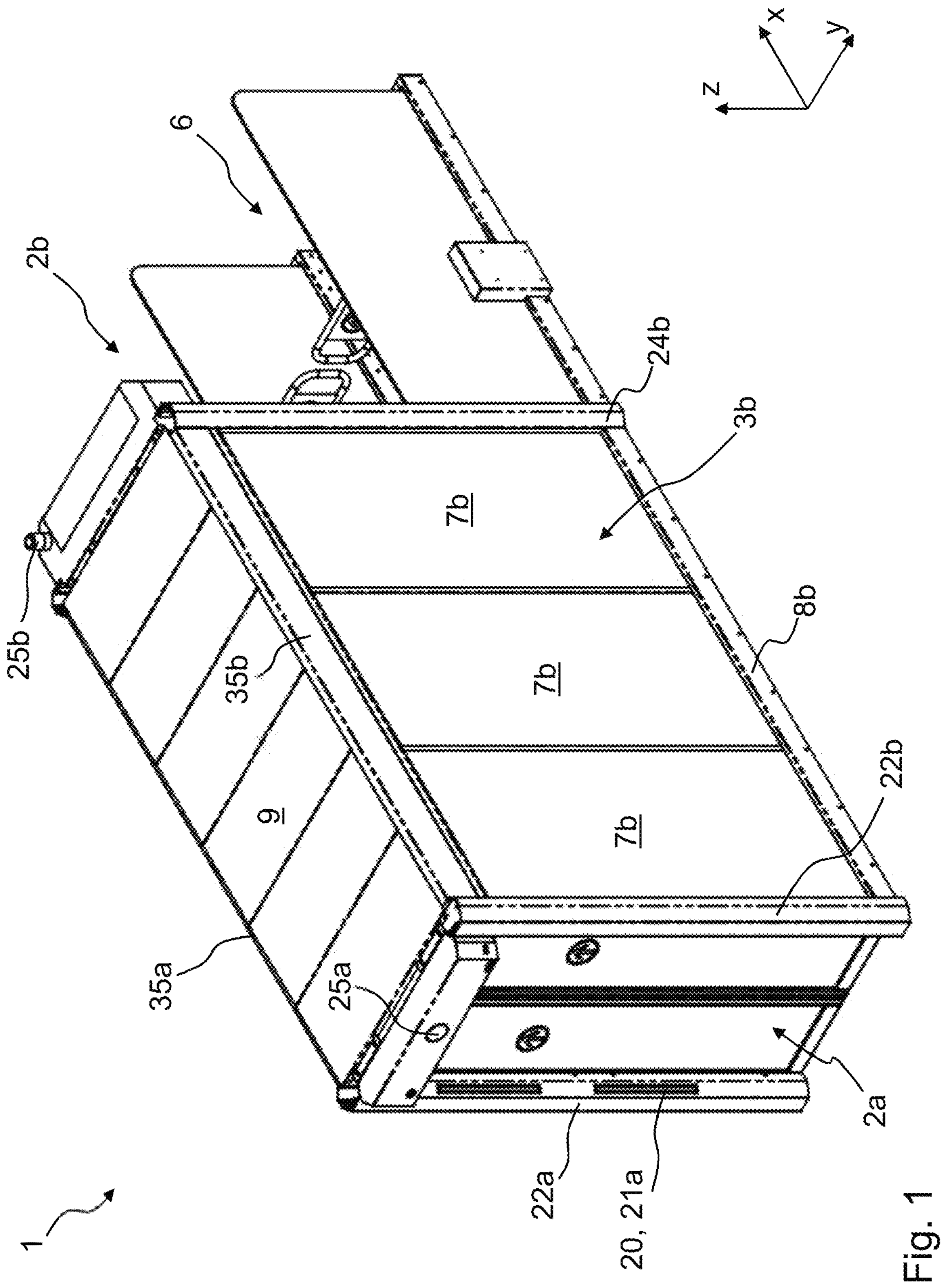

arrangement (2*a*); and/or b) goes back after the exit door arrangement (2*b*) in the direction of the passage area (4). An illumination device (20), which is arranged in the passage area (4) can illuminate the passage area in different colors. The control device can enter different operating modes, wherein the entrance door arrangement (2*a*) and the exit door arrangement (2*b*) are controlled accordingly depending on the operating mode, and wherein the illumination device (20) illuminates the passage area (4) with different colors depending on the operating mode.

20 Claims, 11 Drawing Sheets

(56) References Cited

U.S. PATENT DOCUMENTS

| | | | | |
|---|---|---|---|---|
| 6,472,984 | B1 * | 10/2002 | Risi | E06B 3/903 49/31 |
| 10,337,245 | B2 * | 7/2019 | Grillberger | E06B 3/90 |
| 2002/0094111 | A1 | 7/2002 | Puchek et al. | |
| 2003/0199996 | A1 | 10/2003 | Reynard et al. | |
| 2007/0091057 | A1 | 4/2007 | Lee et al. | |
| 2009/0090063 | A1 | 4/2009 | Kucer et al. | |
| 2013/0009747 | A1 | 1/2013 | Osann, Jr. | |
| 2013/0248124 | A1 | 9/2013 | Barbulescu | |
| 2018/0182213 | A1 | 6/2018 | Osumi et al. | |
| 2020/0123854 | A1 * | 4/2020 | Oh | E06B 11/022 |

FOREIGN PATENT DOCUMENTS

| | | | | |
|---|---|---|---|---|
| DE | 102004048403 | | 4/2006 | |
| DE | 102007019214 | | 10/2008 | |
| DE | 202006021252 | U1 * | 4/2014 | G07C 9/27 |
| DE | 202015002540 | | 4/2015 | |
| EP | 2259226 | | 12/2010 | |
| FR | 2979373 | | 3/2013 | |
| WO | WO-2015037772 | A1 * | 3/2015 | G08B 13/19645 |

OTHER PUBLICATIONS

International Search Report in PCT/EP2019/084282 mailed Mar. 30, 2020.

International Preliminary Report on Patentability in PCT/EP2019/084282, dated Jun. 17, 2021.

* cited by examiner

ONE-WAY PASS-THROUGH SYSTEM WITH RETURN BLOCK FOR USE IN BUILDINGS, AND A CORRESPONDING BUILDING HAVING A ONE-WAY PASS-THROUGH SYSTEM OF THIS KIND

This application is a continuation of co-pending U.S. patent application Ser. No. 17/312,159, filed on Jun. 9, 2021, which is a 371 of PCT/EP2019/084282, filed on Dec. 9, 2019, published on Jun. 18, 2020 under publication number WO 2020/1204158, which claims priority benefits from German Patent Application No. 20 2018 107 098.3, filed on Dec. 12, 2018, the disclosures of each of which are incorporated herein by reference.

The invention relates to a one-way passage system with a non-return barrier for use in buildings and a corresponding building, with such a one-way passage system installed.

Nowadays, such one-way passage systems are used where people need to pass from a security area to a publicly accessible area or to an area with a lower security level, whereby the people are not allowed to change areas in reverse order. One application, for example, is in airports where passengers are allowed to leave the security area they could only enter under previous security checks. The one-way passage systems are designed in such a way that people can only pass through the one-way passage system in one direction. If a person wants to pass the one-way passage system in the opposite direction, a corresponding barrier closes.

The disadvantage of known one-way passage systems from the state of the art is that with these it is only rarely possible that the actually possible number of people can actually pass. Furthermore, it is not always obvious to safety and maintenance personnel which one-way passage system has just experienced a safety incident or malfunction.

It is therefore the object of the present invention to provide a one-way passage system that allows more people to pass through on average.

The object is solved with respect to the one-way passage system according to embodiments of present disclosure, and to a corresponding building with such a one-way passage system.

The one-way passage system with a non-return barrier according to the invention is for use in buildings. It comprises an entrance door arrangement and, offset therefrom, an exit door arrangement. A first and a second side wall arrangement are provided between the entrance door arrangement and the exit door arrangement. This defines a passage area between the entrance door arrangement and the exit door arrangement. The entrance door arrangement is installed in the security area and the exit door arrangement is installed, for example, in an area accessible to the public. Furthermore, a sensor device is provided that comprises several sensors and is configured to detect persons in front of the entrance door arrangement or in the passage area or after the exit door arrangement. Furthermore, a control device is provided which is configured to receive the sensor data of the sensor device (e.g. via common bus protocols) and to analyze them accordingly. The control device is further configured to enter a safety operating mode and to close the entrance door arrangement if an analysis of the sensor data indicates that a person located in the passage area is walking back toward the entrance door arrangement, or if a person who has passed through the exit door arrangement is walking back into the passage area. Furthermore, an illumination device is provided, which is arranged in the passage area and which is configured to illuminate the passage area in different colors. The control device is then further configured to switch to different operating modes (in particular depending on the analyzed sensor data), wherein the entrance and exit door arrangements are controlled accordingly by the control device depending on the operating mode, and wherein the control device is further configured to control the illumination device in such a way that it illuminates the passage area with different colors depending on the operating mode of the control device.

In particular, by using the illumination device according to the invention, which can light up with different colors, a person is signaled at an early stage that he or she is about to try to go back from the passage area or from outside the exit door arrangement, in particular to the entrance door arrangement. In such a case, the safety operating mode is about to be triggered and the entrance door arrangement is closed. As a result, no more people can get outside from the security area and the number of people that can pass through the one-way passage system is reduced. However, according to the invention, the person who triggered the safety operating mode is informed of this at an early stage and can reverse accordingly, causing the one-way passage system to return to the normal operating mode and allowing people to pass through the one-way passage system again. At the same time, in such a case, a corresponding security department or, in other cases, a maintenance department can be made aware of the corresponding operating mode of the one-way passage system more quickly. They can then more quickly ensure that this condition is remedied, so that the one-way passage system can be used normally again as quickly as possible.

In an embodiment according to the invention, the illumination device comprises a first lighting device which is mounted on or in the first ground profile of the first side wall arrangement or directly in the ground. The same applies to a second lighting device with respect to an arrangement on or in the second ground profile of the second side wall arrangement.

The corresponding first or second lighting device consists either of several LED strips (light emitting diode), which are arranged next to each other, whereby each LED strip lights up in its own color, or of a multi-color LED strip, which in turn comprises a plurality of LEDs and whereby this can be controlled (in particular by the control device) in such a way that only LEDs of a certain color light up. The same also applies to the second lighting device. The use of such LED strips results in high luminosity with only low heat generation.

Preferably, a first receiving groove is formed between the first ground profile and the floor, in which the first lighting device is arranged. The same applies to the second ground profile and the floor with regard to the second lighting device. This results in indirect illumination of the floor surface in particular and the respective lighting device fits coherently into the overall appearance of the one-way passage system. The respective LED strips can be provided behind a common protective glass arrangement, which is preferably flush with the respective ground profile. This prevents dirt from entering the respective receiving groove.

The illumination device could also further comprise a first entrance side light arrangement and a second entrance side light arrangement disposed on first and second vertical profiles of the entrance door arrangement, respectively. The same could also apply to a first exit side light arrangement and a second exit side light arrangement. As a result, people are informed of the status, i.e. the current operating mode, of the one-way passage system even before they enter it, and can quickly select another one in the event of a malfunction or failure of the one-way passage system.

In particular, the control device distinguishes between different operating modes and can switch between them as desired. Preferably, the control device enters a normal operating mode or a lock operating mode. In such a normal operating mode or lock operating mode, persons may walk from the entrance door arrangement toward the exit door arrangement and exit the one-way passage system at the exit door arrangement. In normal operating mode, the control device always attempts to keep the entrance and exit door arrangements open or to open the entrance door arrangement when an analysis of the sensor data of the sensor device indicates that a person is approaching the entrance door arrangement. The exit door arrangement is also opened in return or when a person is detected in the passage area. The exit door arrangement can also be opened or is opened if an analysis of the sensor data of the sensor device shows that there is a person in the passage area. In contrast, one door arrangement is always closed in the lock operating mode. Thus, the entrance and exit door arrangements can only be opened when the other door arrangement is closed. This prevents objects from being thrown through from the non-security area into the security area.

The control device can also be operated in a restricted operating mode. In this case, both the entrance door arrangement and the exit door arrangement are locked. This operating mode is adopted when no person is to enter the non-security area from the security area, for example outside operating hours.

The control device is also configured to enter a malfunction operating mode. This usually occurs when the analysis of the sensor data shows that an object is lying in the passage area. This can happen, for example, if a bag, jacket or umbrella is accidentally forgotten or left lying around. In this case, the entrance door arrangement is closed until the object has been removed (e.g. by a security service). However, the exit door arrangement remains open so that, for example, the person who lost the object can retrieve it.

Particularly preferably, the control device is configured to control the illumination device such that it illuminates the passage area with red light when the control device is in safety operating mode and/or restricted operating mode. If the control device is in normal operating mode and/or lock operating mode, then the passage area is preferably illuminated with green light. In malfunction operating mode, on the other hand, the passage area is preferably illuminated with yellow light.

Preferably, in the normal operating mode or in the lock operating mode, the control device controls the illumination device and, within it, the first or second lighting device such that it produces a running light effect that moves from the entrance door arrangement toward the exit door arrangement. LEDs adjacent to each other are turned on and off in alternation so that a person sees a running light effect, i.e., the person thinks that the light source is moving. This indirectly outlines the path from the entrance door arrangement to the exit door arrangement. The speed of the running light effect can be adjusted. A higher speed, in particular a slightly higher speed of the running light effect compared to the normal walking speed (e.g. +5%, 10%, 15%, 20%, 25%, 30%, 35%, 40%, or more than 40%, but in particular less than 100%) can be used to encourage people to walk faster.

In malfunction operating mode, the control device controls the illumination device and in it the corresponding first and/or second lighting device in such a way that these produce a flashing effect, i.e. are switched on and off at predetermined intervals. If a person loses his jacket, for example, he can still recognize this because the passage area of the one-way passage system is very quickly illuminated in a different color.

In principle, a video surveillance system could also be provided. This can be connected to a control and monitoring system. In this way, several one-way passage systems can be monitored via one monitoring station. The control device is then configured, in particular in safety operating mode and/or in malfunction operating mode, to control the video surveillance system in such a way that it records the video signal of the passage area and/or of an area in front of the entrance door arrangement and/or of an area in front of the exit door arrangement and outputs it on a local display system (e.g. directly on the one-way passage system) or in a control and monitoring system. The video signal itself can also be stored in a memory system for later access if needed.

The one-way passage system can also take any shape and run around corners, for example. In principle, it is also possible that an intermediate door arrangement is also provided, which is located between the entrance and exit door arrangements.

The building according to the invention comprises in particular two rooms which are separated from each other by at least one wall. This at least one wall has an opening in which the one-way passage system is installed, whereby persons can only pass from one room to the other room.

Figure 3:
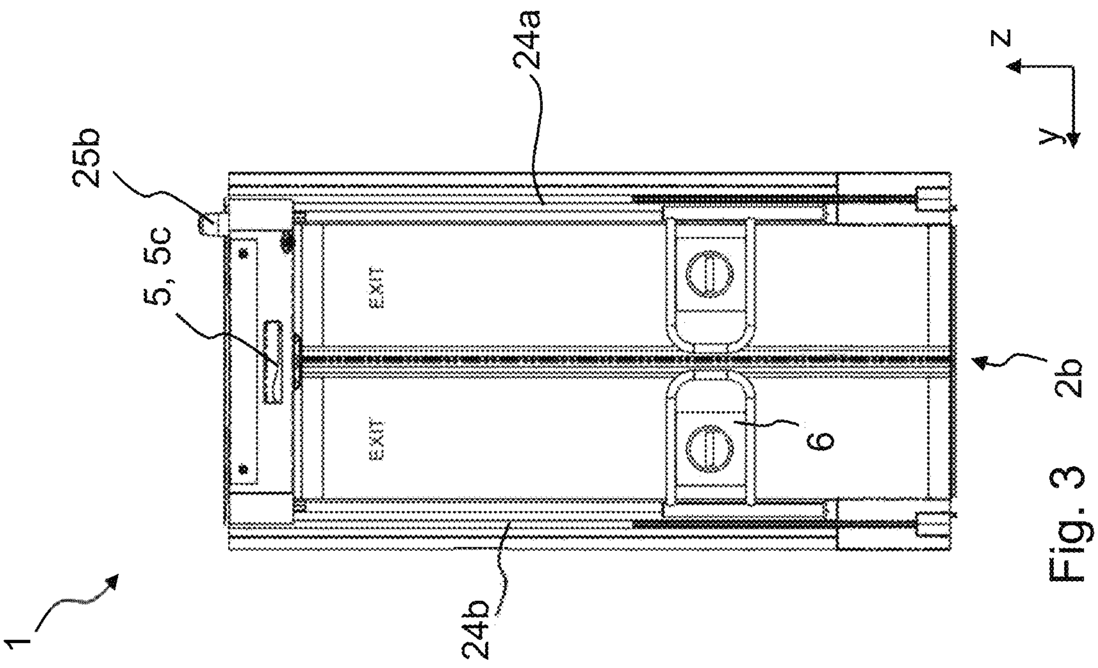
Figure 2:
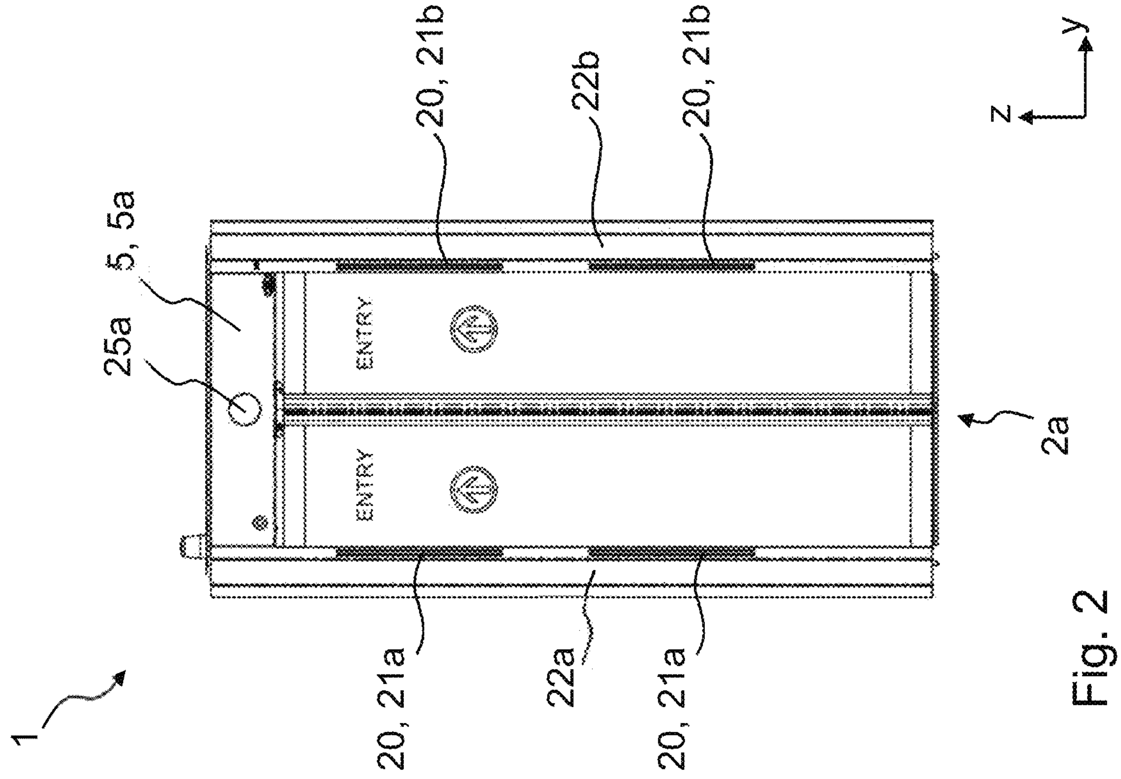
Figure 4:
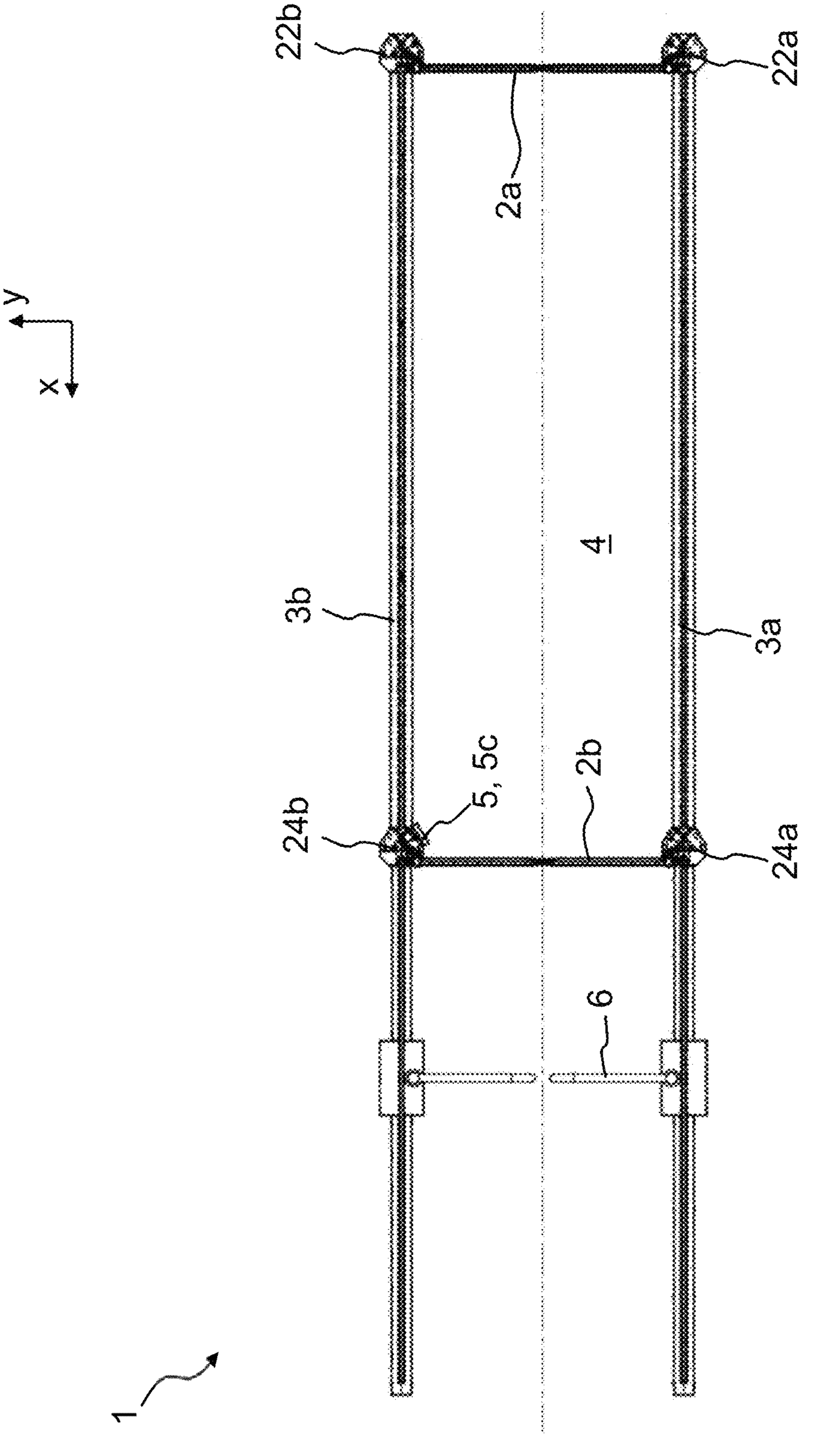
Figure 5:
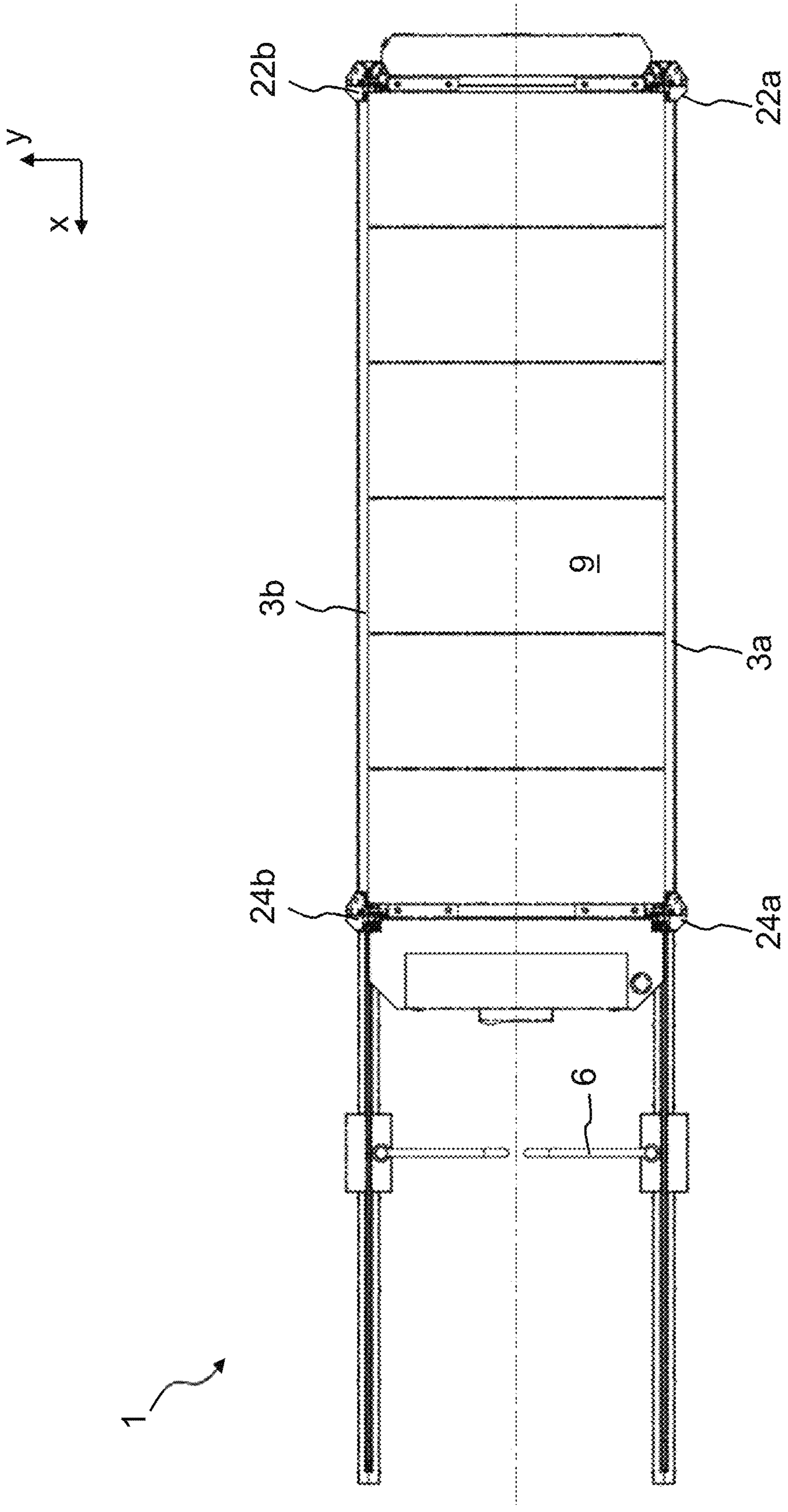
Figure 6:
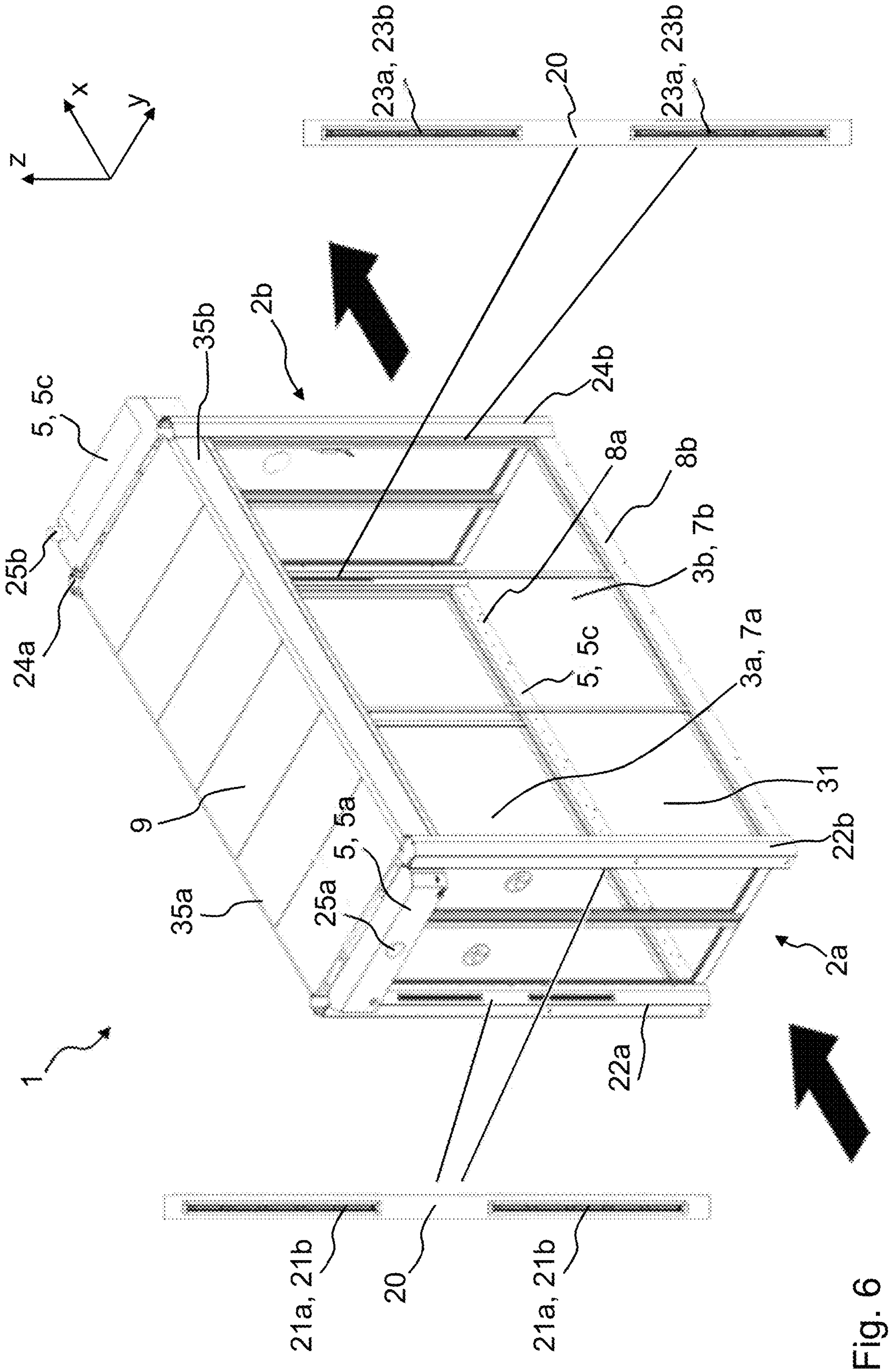
Figure 7:
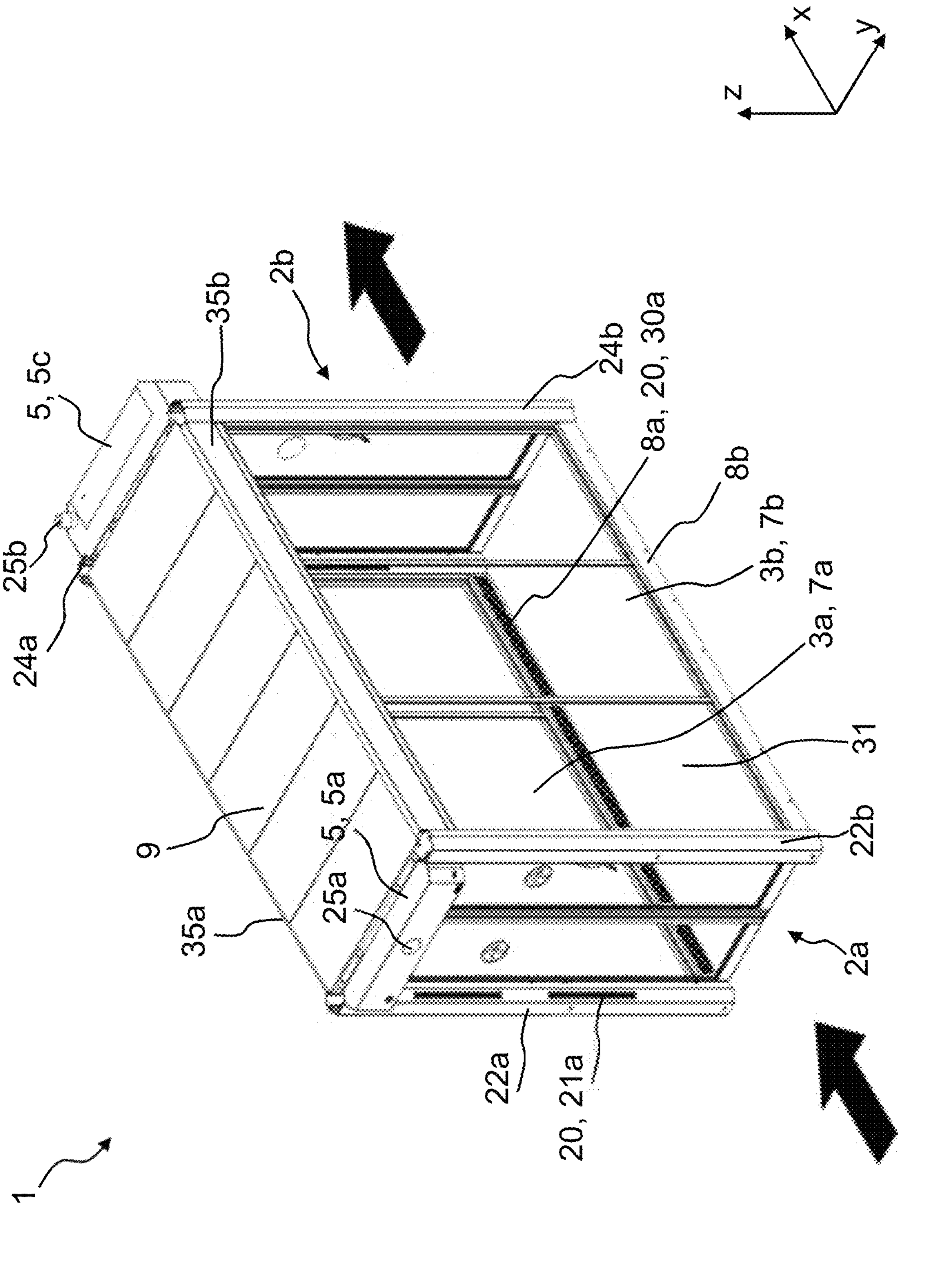

Various embodiments of the invention are described below by way of example with reference to the drawings. Identical objects have the same reference signs. The corresponding figures of the drawings show in detail:

FIG. 1: a spatial illustration of the one-way passage system;

FIG. 2: a front view of an entrance door arrangement of the one-way passage system;

FIG. 3: a rear view of an exit door arrangement of the one-way passage system;

FIG. 4: a longitudinal section through the one-way passage system;

FIG. 5: a top view of the one-way passage system;

FIG. 6: light arrangements on the entrance side and on the exit side;

FIG. 7: a first lighting device in a first ground profile in restricted operating mode;

FIGS. 8A, 8B, 8C, 8D, 8E:

various first lighting devices in or on a first ground profile in normal operating mode with a running light effect;

FIGS. 9A, 9B:

a first lighting device in a first ground profile in a safety operating mode; and

FIGS. 10A, 10B, 10C:

various first lighting devices in or on a first ground profile in a malfunction operating mode.

FIG. 1 shows a spatial illustration of the one-way passage system 1 according to the invention, which comprises a non-return barrier (as will be explained below) and is suitable for use in buildings.

An entrance door arrangement 2*a* and an exit door arrangement 2*b* are provided. These are arranged offset from each other (a distance between them can preferably be more than 2 m, 3 m, 4 m, 5 m, 6 m, 7 m, 8 m, 9 m, 10 m or more than 15 m, but preferably less than 20 m, 16 m, 13 m, 8 m). A first side wall arrangement 3*a* and a second side wall arrangement 3*b* are arranged between the entrance door arrangement 2*a* and the exit door arrangement 2*b* (see e.g. FIG. 3), whereby a passage area 4 is defined between the entrance door arrangement 2*a* and the exit door arrangement 2*b*. A sensor device 5 is further provided comprising a plurality of sensors 5*a*, 5*b*, 5*c* for detecting persons 10 and objects 11. For example, a first sensor 5*a* is arranged at the entrance door arrangement 2*a* (see FIGS. 1, 2). A second sensor 5*b* is arranged, for example, in the passage area 4 (see FIG. 4). A third sensor 5*c* is preferably arranged at the exit door arrangement 2*b* (see FIG. 3). Each of these sensors 5*a*, 5*b*, 5*b* can be selected from a sensor group, whereby this sensor group comprises IR sensors (active, passive), radar sensors, ultrasonic sensors, light barriers and ToF sensors (Time of Flight). Each sensor 5*a*, 5*b*, 5*c* may also comprise several (different) sensors.

To avoid false triggering of the sensors 5*a*, 5*b*, 5*c*, they are trained to the environment in a training mode. In such a training mode, stationary objects and/or the moving door leaves of the entrance door arrangement 2*a* and the exit door arrangement 2*b* are stored accordingly and later measurement results are compensated by this stored data.

The sensors 5*a*, 5*b*, 5*c* can also comprise acceleration sensors in order to be able to compensate for vibrations. If the vibrations exceed a corresponding threshold value, a corresponding sensor signal is either not output or not further processed or reduced or smoothed by a predetermined value.

The entrance door arrangement 2*a* preferably comprises two rotary wings whose primary closing edges face each other in the closed state. The rotary wings open in the direction of the first and second side wall arrangements 3*a*, 3*b*, respectively. The same applies to the exit door arrangement 2*b*, which also comprises two rotary wings. The entrance door arrangement 2*a* preferably opens inwards, i.e. in the direction of the passage area 4, whereas the exit door arrangement 2*b* opens outwards.

Both the entrance door arrangement 2*a* and the exit door arrangement 2*b* are motor-driven.

For the operation of the entrance door arrangement 2*a* and the exit door arrangement 2*b*, a control device (not shown) is provided in particular, which generates corresponding control signals for opening or closing and/or for stopping. The control device can also control the entrance door arrangement 2*a* and the exit door arrangement 2*b* in such a way that they hold their rotary wings in a certain position.

In principle, it would also be possible to use another intermediate door arrangement arranged in the passage area 4 between the entrance door arrangement 2*a* and the exit door arrangement 2*b*.

It would also be possible for the passage area 4 to have a curved or angled course, for example in particular bent at 90°. In this way, the one-way passage system 1 could also be installed in corners of the building.

With respect to FIG. 4, a barrier arrangement 6 is also shown which is arranged after the exit door arrangement 2*b*. The barrier arrangement 6 preferably opens only in one direction, in this case away from the exit door arrangement 2*b*. With respect to FIG. 1, it is shown that the respective first and second sidewall arrangements 3*a*, 3*b* still extend in the direction of the barrier arrangement 6. Thus, it is not possible to enter laterally between the barrier arrangement 6 and the exit door arrangement 2*b*, thereby then entering the passage area 4.

The first side wall arrangement 3*a* comprises at least one first glass pane 7*a* (three glass panes are shown in this embodiment). The same applies to the second side wall arrangement 3*b*, which shows at least one second glass pane 7*b*.

The first glass pane 7*a* is held by a first ground profile 8*a* (see e.g. FIG. 6). In this case, the second glass pane 7*b* is held by a second ground profile 8*b*.

With regard to FIG. 5, it is further shown that the passage area 4 is still closed by a ceiling arrangement 9. Therefore, persons cannot climb over the corresponding side wall arrangements 3*a*.

The control device is then configured to receive and analyze sensor data from the sensor device 5 (i.e., from one or more of the individual sensors 5*a*, 5*b*, 5*c*).

Figure 8A:
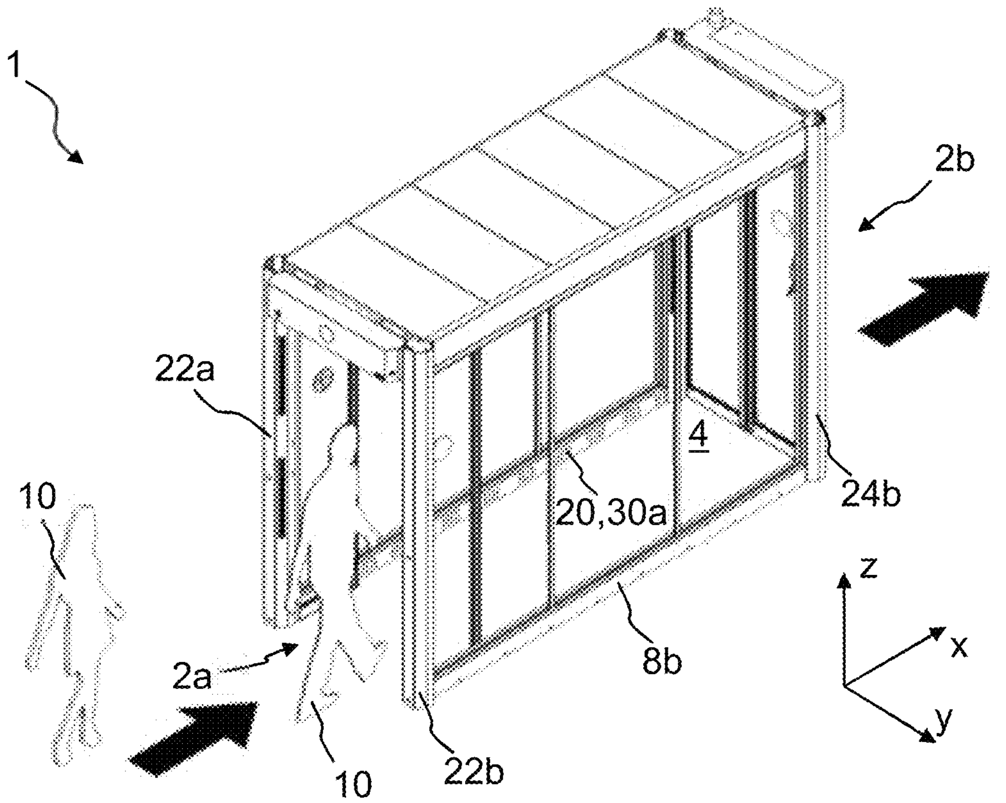
Figure 8B:
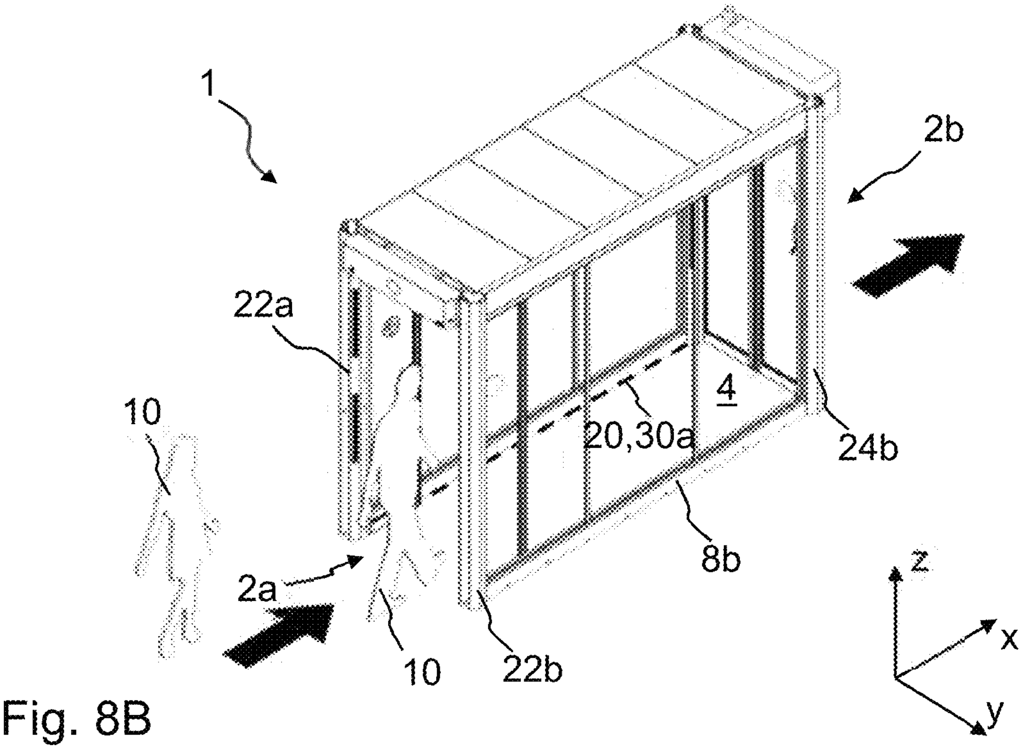
Figure 8C:
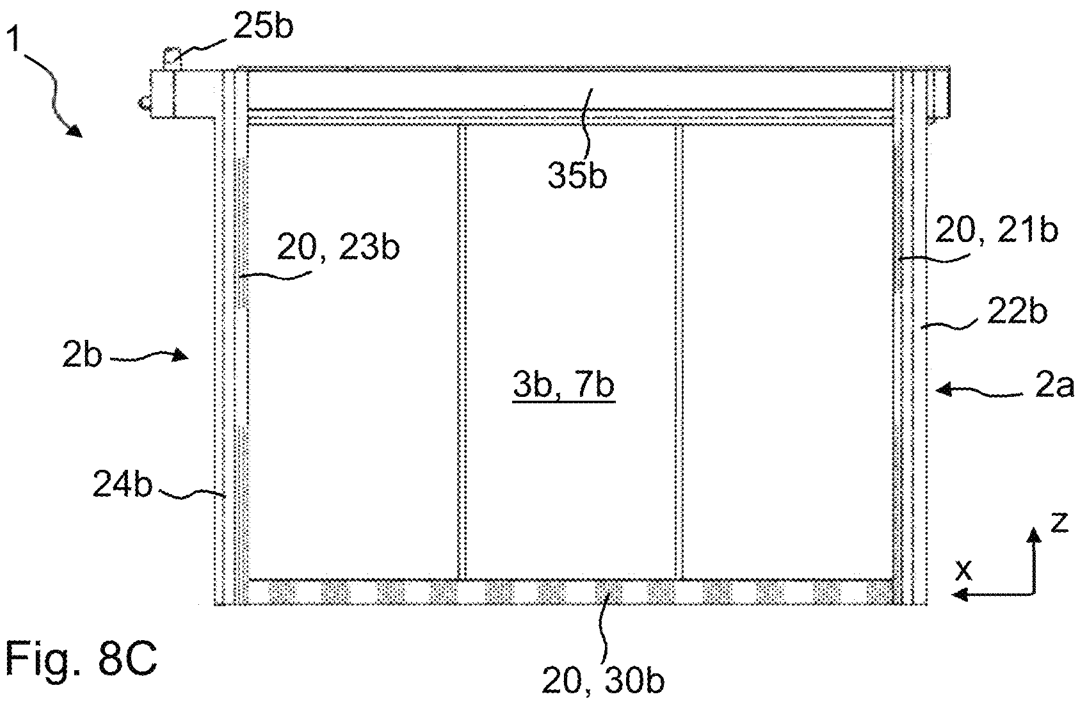
Figure 8D:
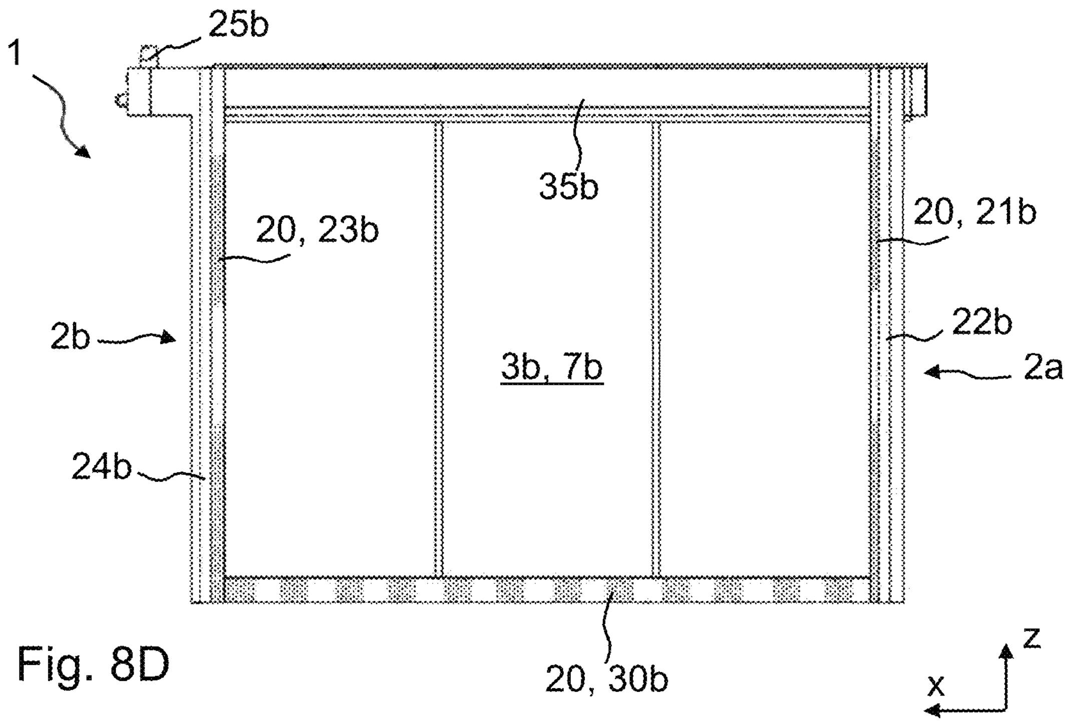

In a normal operating mode, such as that shown in FIGS. 8A and 8B, persons 10 can walk from the entrance door arrangement 2*a* toward the exit door arrangement 2*b* and exit it accordingly. In this normal operating mode, the control device is configured to open the entrance door arrangement 2*a* when an analysis of sensor data from the sensor device 5 indicates that a person 10 is walking toward the entrance door arrangement 2*a*. The control device is also configured to open the exit door arrangement 2*b* when an analysis of the sensor data from the sensor device 5 indicates that a person 10 is in the passage area 4. In principle, the control device could open both the entrance door arrangement 2*a* and the exit door arrangement 2*b* upon detection of a person in front of the entrance door arrangement 2*a*. Alternatively, it would also be possible for the control device to keep both the entrance door arrangement 2*a* and the exit door arrangement 2*b* open at all times in normal operating mode.

Besides the normal operating mode, the one-way passage system according to the invention can also be operated in a lock operating mode. The control device is then configured to open the entrance door arrangement 2*a* or the exit door arrangement 2*b* only when the other door arrangement 2*b*, 2*a* is closed. With respect to FIGS. 8A and 8B, this means that in the example shown, the person 10 can enter the passage area through the opened entrance door arrangement 2*a*. If the person 10 is then in the passage area 4, the entrance door arrangement 2*a* closes. Only when the entrance door arrangement 2*a* is predominantly (e.g. more than 80%, 90%, 95%) or completely closed, the exit door arrangement 2*b* opens.

In principle, the control device could also enter a maintenance operating mode. In this maintenance operating mode, both the entrance door arrangement 2*a* and the exit door arrangement 2*b* are open and persons 10 can enter and exit the one-way passage system 1 in either direction. This maintenance operating mode should only be used when components are being replaced and appropriate security personnel are preventing unauthorized passage.

The control device could also be configured to enter a restricted operating mode. This is shown, for example, in FIG. 7. In this restricted operating mode, the control device is configured to close the entrance door arrangement 2*a* and exit door arrangement 2*b*. This restricted operating mode should be used especially outside business hours.

The control device is further configured to adopt a malfunction operating mode. Such a mode is shown for example in FIGS. 10A to 10C. The control device changes to the malfunction operating mode when the analysis of the sensor data indicates that an object 11 is located in the passage area 4. In this malfunction operating mode, the control device is configured to close the entrance door arrangement 2*a* and keep the exit door arrangement 2*b* open. Thus, the person who lost the object 11 in the passage area 4 can retrieve it.

In this malfunction operating mode, the control device can also be configured to trigger an alarm immediately or after a predetermined time has elapsed so that an employee of the security service removes this object from the passage area 4. In the event that the analysis of the sensor data no longer shows such an object 11, the control device is configured to change from the malfunction operating mode back to the normal operating mode or to the lock operating mode. A corresponding change of operating mode can also be given by a higher-level control device. It can also be set directly via a corresponding selection element (e.g. key switch) on the one-way passage system 1.

Figure 9A:
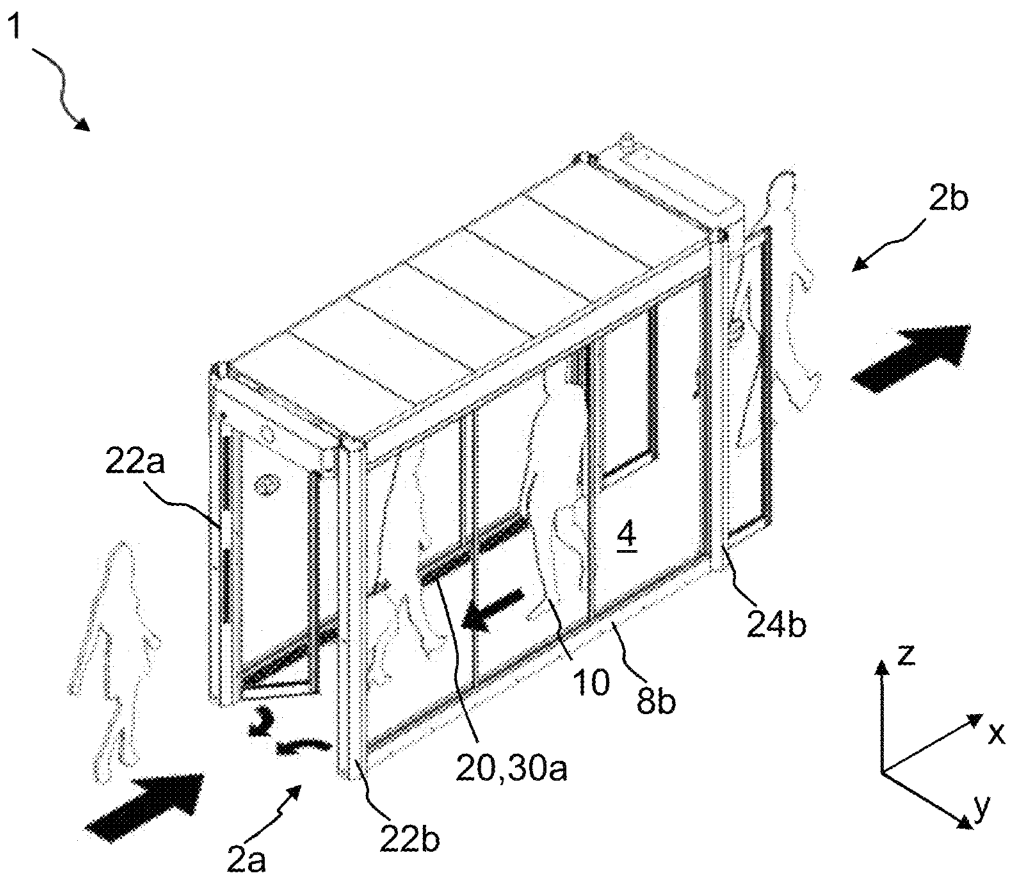
Figure 9B:
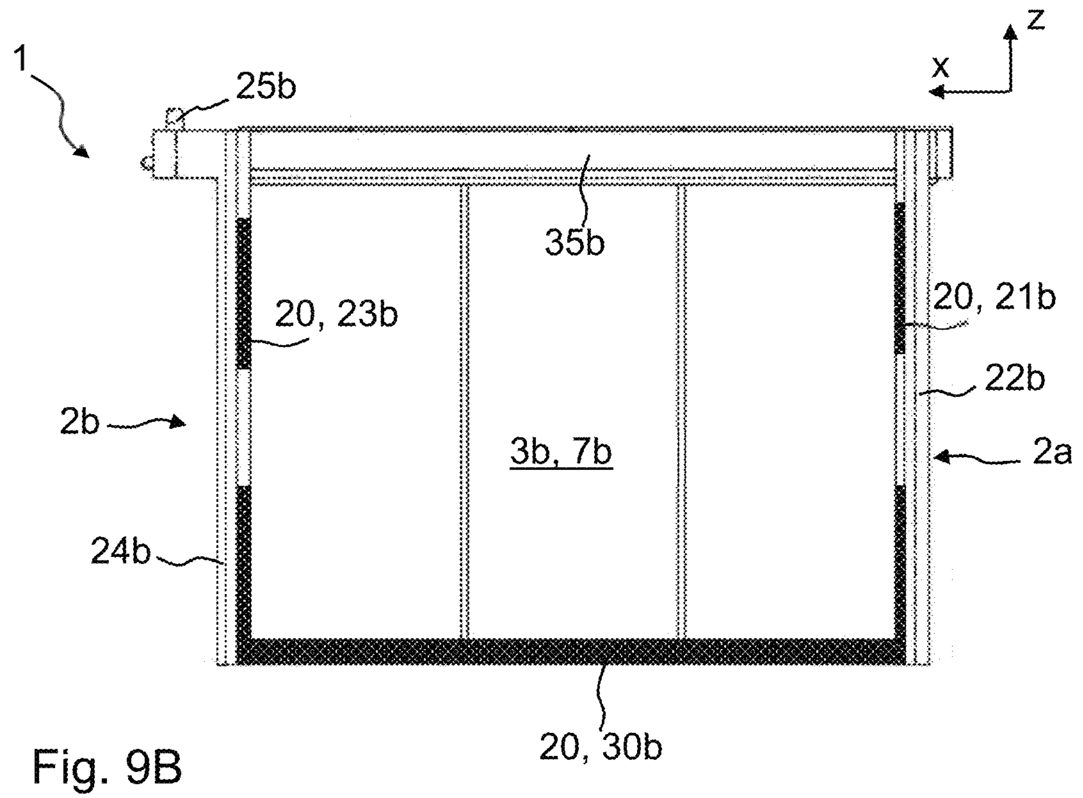

Furthermore, the control device may also enter a safety operating mode. This occurs when the analysis of the sensor data from the sensor device 5 indicates that a person 10 who is in the passage area 4 is walking back toward the entrance door arrangement 2*a*, or that a person 10 who has already left the exit door arrangement 1*b* is walking back toward the passage area 4. Such a situation is illustrated in FIGS. 9A, 9B. In this case, the control device is configured to close the entrance door arrangement 2*a*.

At the same time, an alarm can still be issued immediately, which strikes a higher-level control and monitoring system and informs appropriate security personnel. It would also be possible for such an alarm to be issued only after a predetermined period of time has elapsed, for example if this person 10 remains in the passage area 4 for a predetermined period of time and does not leave it via the exit door arrangement 2*b*.

In particular, the change to the safety operating mode occurs when the person is closer to the exit door arrangement 2*b* than to the entrance door arrangement 2*a* and then walks back toward the entrance door arrangement 2*a*. On the other hand, if the person is closer to the entrance door arrangement 2*a* than to the exit door arrangement 2*b*, then the person 10 may be allowed to go back and exit the entrance door arrangement 2*a* again. However, if the person is outside the entrance door arrangement 2*b* and walks back toward the passage area 4, then the entrance door arrangement 2*a* should be closed in any case.

In principle, a video surveillance system could also be provided. The video surveillance system is then configured to record video surveillance signals of the passage area 4 and/or an area in front of the entrance door arrangement 2*a* and/or an area in front of the exit door arrangement 2*b* (i.e. outside the exit door arrangement 2*b*). In particular, this recording takes place when the control device is in safety operating mode and/or in malfunction operating mode. The video data can then be fed to a higher-level control and monitoring system and displayed on a display system there. The video data could also be displayed on a display system located nearby, i.e., locally directly at the one-way passage system. A memory system could also be provided in which the video data is stored.

In the following, an illumination device 20 is described which is arranged in the passage area 4 and which is configured to illuminate the passage area 4 in different colors. The control device is configured to control the illumination device 20 in such a way that it illuminates the passage area 4 with colors corresponding to the respective operating mode of the control device. The illumination device 20 therefore illuminates the passage area 4 with different colors depending on which operating mode the control device is in. Preferably, the passage area 4 is illuminated with only one color per operating mode, so that it is immediately apparent to persons in which operating mode the control device is currently in. Different operating modes can also share one color.

Preferably, the control device is configured to control the illumination device 20 such that it illuminates the passage area 4 with red light when the control device changes to or is in the safety operating mode or restricted operating mode. On the other hand, the control device is preferably configured to control the illumination device 20 such that it illuminates the passage area 4 with green light when the control device is in or changes to the normal operating mode or the lock operating mode. On the other hand, the control device is further preferably configured to control the illumination device 20 such that it illuminates the passage area 4 with yellow light when the control device is in or changes to malfunction operating mode.

In the following, the illumination device 20 will be described in further detail. With reference to FIGS. 2 and 6, it is shown that the illumination device 20 comprises a first entrance side light arrangement 21*a* and a second entrance side light arrangement 21*b*. The first entrance side light arrangement 21*a* is arranged on a first vertical profile 22*a* of the entrance door arrangement 2*a*, whereas the second entrance side light arrangement 21*b* is arranged on a second vertical profile 22*b* of the entrance door arrangement 21*b*. The first vertical profile 22*a* is further preferably configured to support the first side wall arrangement 3*a*. The second vertical profile 22*b*, on the other hand, is preferably configured to support the second side wall arrangement 3*b*. In this embodiment, the first entrance side light arrangement 21*a* extends over a certain height of the first vertical profile 22*a*. In this case, the first entrance side light arrangement 21*a* is formed of two partial light arrangements spaced apart from each other. In this case, the first entrance side light arrangement 21*a* is preferably visible from outside of the one-way passage system 1. In addition or alternatively, it would also be possible for the first entrance side light arrangement 21*a* to also radiate inwards, i.e. into the passage area 4.

The features described for the first entrance side light arrangement 21*a* may also apply to the second entrance side light arrangement 21*b*.

Furthermore, a first exit side light arrangement 23*a* and a second exit side light arrangement 23*b* are also provided. The first exit side light arrangement 23*a* is preferably arranged on a first vertical profile 24*a* of the exit door arrangement 2*b*. The second exit side light arrangement 23*b* is preferably arranged on a second vertical profile 24*b* of the exit door arrangement 2*b*. The first vertical profile 24*a* is preferably further configured to support the first sidewall arrangement 3*a*. The second vertical profile 24*b* of the exit door arrangement 2*b* is further preferably configured to support the second sidewall arrangement 3*b*.

The first exit side light arrangement 23*a* and the second exit side light arrangement 23*b* are preferably arranged in such a way that the light of the exit side light arrangements 23*a*, 23*b* is visible from outside of the one-way passage system 1. In addition or alternatively, they could also be arranged such that they radiate into the passage area 4.

Preferably, the first or second exit side light arrangements 23*a*, 23*b* extend over at least a part of the respective vertical profile 24*a*, 24*b*. Each of the first and/or second exit side light arrangement 23*a*, 23*b* could also consist of two or more than two partial light arrangements extending over a certain height of the respective vertical profile 24*a*, 24*b*.

In principle, both the light arrangements 21*a*, 21*b* on the entrance side and the light arrangements 23*a*, 23*b* on the exit side preferably comprise LEDs, wherein these preferably light up in the same color depending on the operating mode of the control device.

With respect to FIGS. 1, 2, and 3, an entrance side visual signaling device 25*a* and an exit side visual signaling device 25*b* are also provided. The entrance-side visual signaling device 25*a* is arranged above the entrance door arrangement 2*a* (above the door leaves). The control device is then configured to control the entrance side visual signaling device 26*a* to visually display an output signal corresponding to the operating mode of the control device. With respect to FIG. 2, the entrance side visual signaling device 25*a* is configured to display, for example, a corresponding color (e.g., red cross, or green circle) to indicate to persons 10 whether they can exit the building through the one-way passage system 1.

Nothing else applies to the exit side visual signaling device 25*b*. This is preferably arranged above the exit door arrangement 2*b*. In this case, the exit side visual signaling device 25*b* is in form of a signal light which preferably flashes. In this case, the control device is also configured to control this exit side visual signaling device 25*b* in such a way that it visually displays an output signal corresponding to the operating mode of the control device. For example, if a person 10 wishes to re-enter the passage area 4, the exit side visual signaling device 25*b* could output a corresponding flashing signal to alert security personnel. This flashing signal may have a specific color (e.g., red or yellow).

With reference to FIGS. 7, 8A, 8B, 8C, 8D, 8E, 9A, 9B, 10A, 10B and 10C, a further aspect of the illumination device 20 is described. With reference to FIG. 7, this comprises a first lighting device 30*a*, wherein the first lighting device 30*a* is arranged on or in the first ground profile 8*a* of the first sidewall arrangement 3*a*. The first lighting device 30*a* could also be arranged directly in the floor 31.

Nothing else applies to a second lighting device 30*b*, wherein the second lighting device 30*b* is arranged on or in the second ground profile 8*b* of the second sidewall arrangement 3*b*. The second lighting device 30*b* could also be arranged directly in the floor 31.

In said figures, the first lighting device 30*a* is represented by different shadings. These different shadings are intended to represent different colors and/or lighting effects.

The first lighting device 30*a* preferably comprises a plurality of LED strips (or LED light strings), wherein each LED strip comprises a plurality of LEDs and wherein each LED strip lights up in a different color. In this regard, the first lighting device 30*a* extends from the entrance door arrangement 2*a* toward the exit door arrangement 2*b*. In particular, it extends from the first vertical profile 22*a* of the entrance door arrangement 2*a* toward the first vertical profile 24*a* of the exit door arrangement 2*b*.

The same also applies to the second lighting device 30*b*, which in this case extends from the second vertical profile 22*b* of the entrance door arrangement 2*a* to the second vertical profile 24*b* of the exit door arrangement 2*b*. In principle, several LED strips could also be arranged in series to illuminate the entire length of the passage area 4 accordingly.

The first lighting device 30*a* could also be a multi-color LED strip, wherein the multi-color LED strip comprises a plurality of LEDs, and wherein the multi-color LED strip is controllable such that only LEDs of a certain color light up or that LEDs of a certain color always light up. The same may also apply to the second lighting device 30*b*.

As already explained, several LED strips can be connected in series. Such a LED strip preferably has a length of 50 cm or more. The power is about 7 W. The first lighting device 30*a* therefore requires approximately an electrical power of more than 25 or more than 30 W. The same applies to the second lighting device 30*b*.

FIG. 8A shows that the first lighting device 30*a* extends over the entire height of the first ground profile 8*a*. This could be the case, for example, if several LED strips are arranged one above the other.

However, the variant of FIG. 8B is preferred. In a particularly preferred embodiment, a first receiving groove is formed between the first ground profile 8*a* and the floor 31, with the first lighting device 30*a* being arranged in this first receiving groove. The same applies to the second ground profile 8*b* and the ground 31, between which a corresponding receiving groove is formed. The second lighting device 30*b* is then arranged in this second receiving groove.

Preferably, the individual LEDs are not directly visible to a user 10 walking along the passage area 4. It is therefore a matter of so-called indirect lighting.

It would also be possible for the first ground profile 8*a* to directly comprise the first receiving groove, in which the first lighting device 30*a* is then arranged. The same could also apply to the second ground profile 8*b* with regard to the second lighting device 30*a*.

Figure 8E:
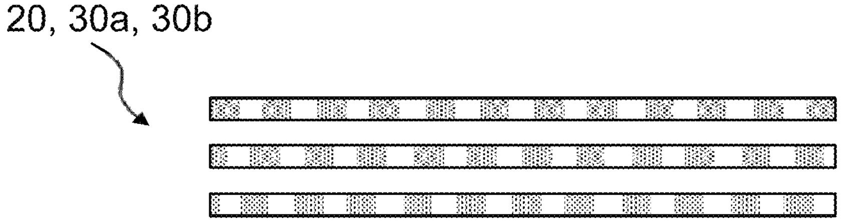

Preferably, not only are the colors of the illumination device 20 with respect to the first lighting device 30*a* and the second lighting device 30*b* different depending on the operating mode of the control device, but also different lighting effects can be used. Thus, in a preferred embodiment, the control device is configured to control the first lighting device 30*a* and the second lighting device 30*b* of the illumination device 20, respectively, in the normal operating mode or in the lock operating mode such that they produce a running light effect from the entrance door arrangement 2*a* toward the exit door arrangement 2*b*. Such a running light effect is exemplarily shown in FIGS. 8C, 8D, 8E. In FIG. 8E, the switched-on LEDs of the first and second light arrangement 30*a*, 30*b*, respectively, are shown at time t=0. At time $t=t_1$, where $t_1>t_0$, the second row shows those LEDs that are now switched on. It can be seen that the lights appear to move from the right side (entrance door arrangement 2*a*) towards the left side (exit door arrangement 2*b*). In the third row, the switched-on LEDs are shown shaded at time $t_2$, where $t_2>t_1$. Not only do switched-on and switched-off LED's alternate in such a running light effect along the length of the first lighting device 30*a* and/or second lighting device 30*b*, respectively, but switched-off LED's are switched on and switched-on LED's are switched off at different times.

The control device is also preferably configured to control the first lighting device 30*a* and/or the second lighting device 30*b* of the illumination device 20, respectively, in the malfunction operating mode (FIGS. 10A-10C) such that they are switched-on and off at predetermined intervals. This produces a flashing effect. Further preferably, the switching off takes place by successively increasing a dimming (e.g. by pulse width modulation), whereas the switching on preferably takes place by successively decreasing the dimming. This creates a smooth light transition. The period with which the first lighting device 30*a* and/or the second lighting device 30*b* flashes is preferably greater than 2, 3, 4, 5, 6, 7, 8, 9 or greater than 10 s. Preferably, however, the period is less than 11 s, 9 s, 7 s, 5 s, 3 s.

Figure 10A:
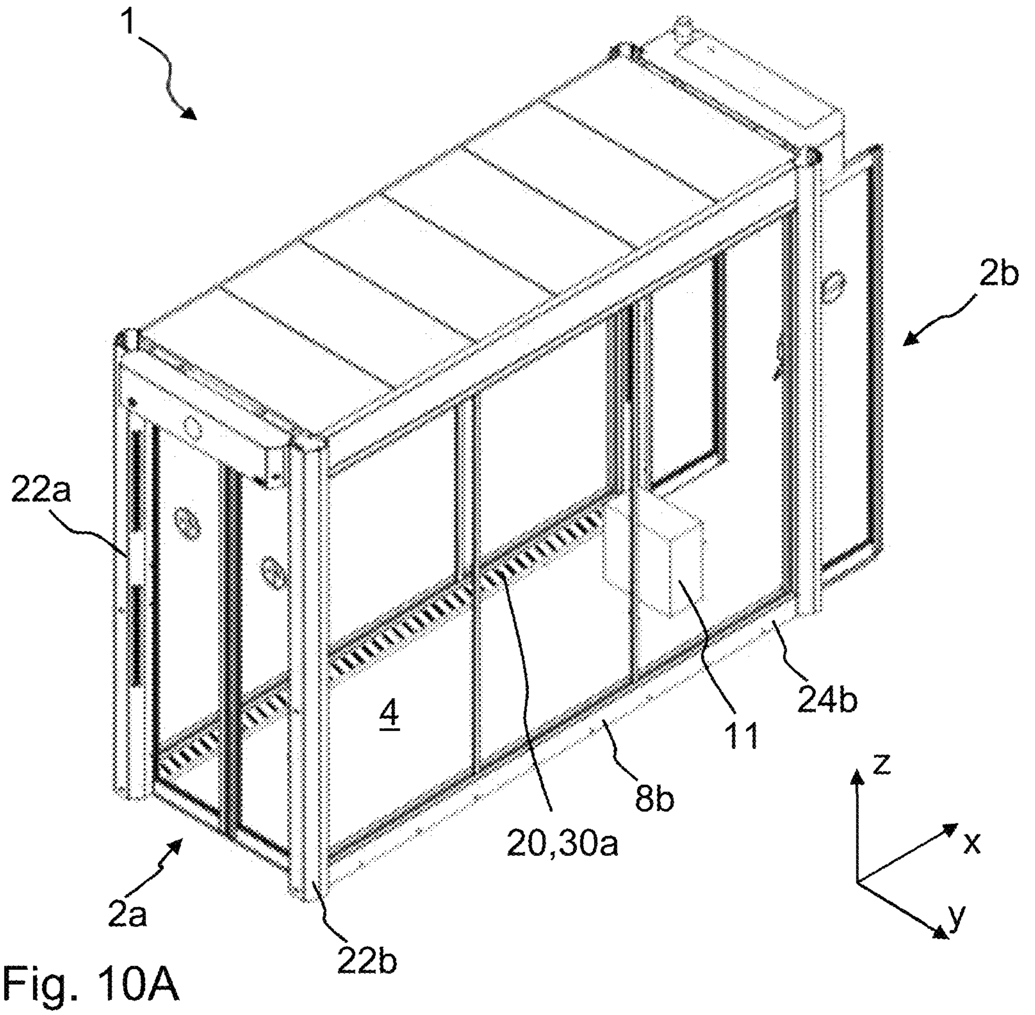
Figure 10B:
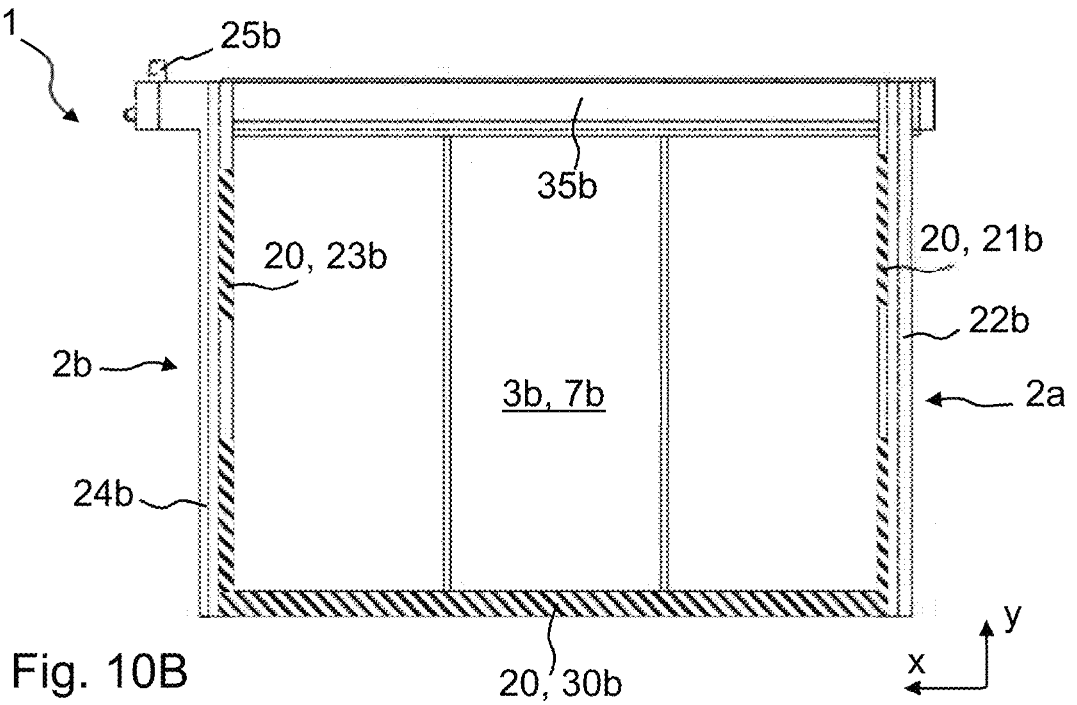
Figure 10C:
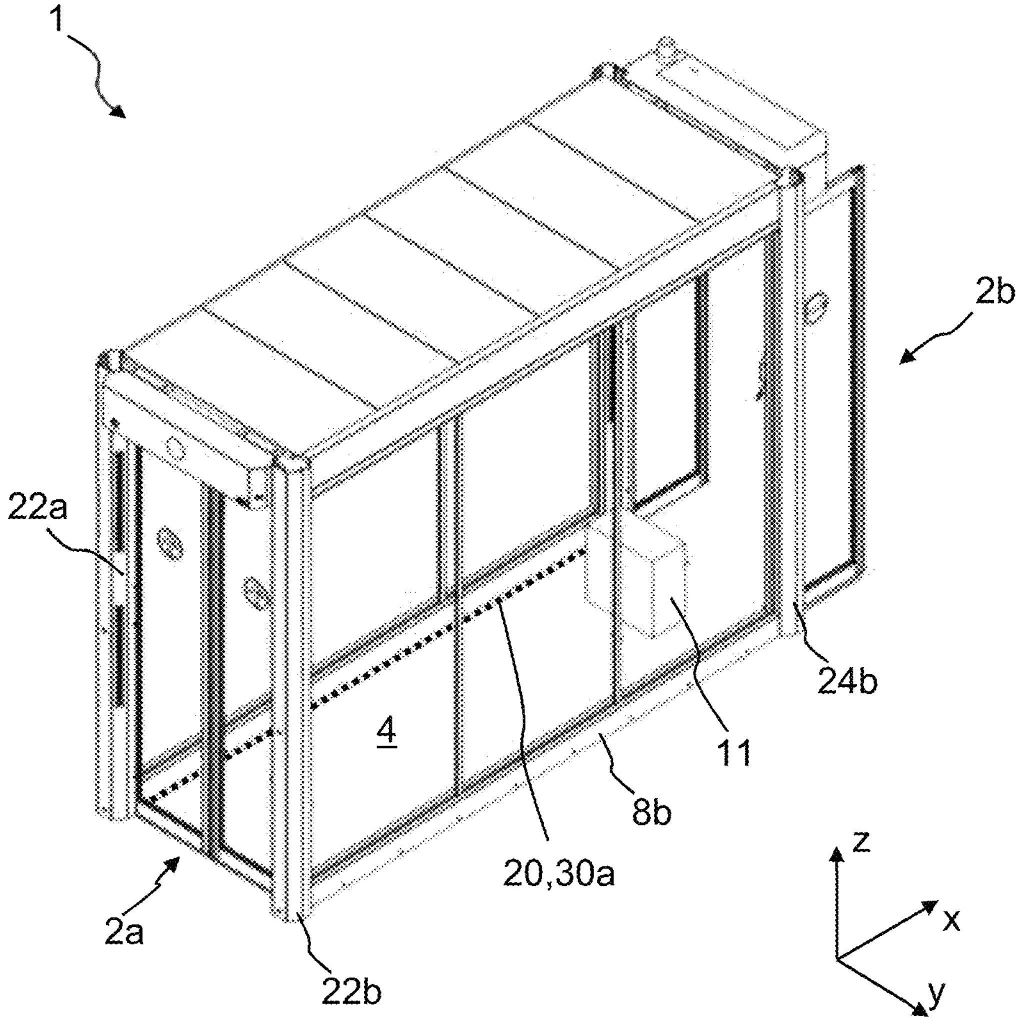

With regard to FIGS. 10A and 10B, the sensor device 5 detects that an object 11 has remained in the passage area 4. In this case, the entrance door arrangement 2*a* is closed and the exit door arrangement 2*b* is kept open. If this object 11 is not removed, then a corresponding alarm signal is output, in particular to a higher-level control and monitoring system.

The illumination device 20 is shown shaded in FIGS. 10A, 10B, and 10C to again illustrate that it illuminates with a different color than in the other operating modes.

FIGS. 9A and 9B again explain the safety operating mode. Thus, a person 10 is shown who wants to move from the passage area 4 back to the entrance door arrangement 2*a*. This is detected by corresponding sensors 5*b* of the sensor device 5 and the entrance door arrangement 2*a* is closed accordingly. In this case, the control device switches to safety operating mode and controls the illumination device 20 in such a way that it lights up with red light in this exemplary case.

In principle, it would also be possible for the illumination device to comprise a third or a fourth lighting device. These third and fourth lighting devices could, for example, be arranged in the first ceiling profile 35*a* and/or second ceiling profile 35*b*. The first ceiling profile 35*a* is configured to hold the first side wall arrangement 3*a*. The second ceiling profile 35*b*, on the other hand, is configured to hold the second sidewall arrangement 3*b*. The third and/or fourth lighting devices could also be mounted in the first ceiling profile 35*a*, 35*b* or in the ceiling arrangement 9 in general. Again, a corresponding receiving groove could be configured between the respective ceiling profile 35*a*, 35*b* and the ceiling arrangement 9, in which the third and/or fourth lighting device 35*a*, 35*b* is arranged.

The invention is not limited to the embodiments described. Within the scope of the invention, all described and/or drawn features can be combined with each other as desired.

The invention claimed is:

1. A one-way passage system with a non-return barrier for use in buildings having the following features:
- an entrance door arrangement and, offset from the entrance door arrangement, an exit door arrangement are provided;
- first and second side wall arrangements are provided between the entrance door arrangement and the exit door arrangement, thereby enclosing a passage area between the entrance door arrangement and the exit door arrangement;
- a sensor device is provided which comprises a plurality of sensors and is configured to detect persons and objects:
- a) in front of the entrance door arrangement;
- b) in the passage area and/or after the exit door arrangement;
- a control device is provided which is configured to receive and analyze sensor data from the sensor device, the control device being further configured to enter a plurality of different operating modes wherein the entrance door arrangement and the exit door arrangement are controlled accordingly by the control device depending on the operating mode, wherein the operating modes include:
  - a safety operating mode wherein the control device closes the entrance door arrangement if an analysis of the sensor data indicates that a person:
  - a) is walking back in the passage area toward the entrance door arrangement; and/or
  - b) is walking back towards the passage area after the exit door arrangement;
  - a malfunction operating mode entered in response to a detection by the sensor of an object in the passage area and wherein the control device opens the exit door arrangement and closes the entrance door arrangement as long as the analysis of the sensor data shows that the object is located in the passage area;
  - a normal operating mode, wherein people can walk from the entrance door arrangement toward the exit door arrangement and exit the one-way passage system at the exit door arrangement;
  - a lock operating mode, wherein the control device is further configured to open the exit door arrangement when the entrance door arrangement is predominantly or completely closed; and
  - a restricted operating mode, wherein the control device is further configured to close the entrance door arrangement and the exit door arrangement; and
- an illumination device, which is arranged in the passage area and which is configured to illuminate the passage area in at least one selected color;
- wherein the control device is further configured to control the illumination device such that it illuminates the passage area with the selected color depending on the operating mode of the control device.

2. The one-way passage system with a non-return barrier according to claim 1, wherein the illumination device comprises:
- a) a first lighting device, wherein the first lighting device is arranged:
  - i) on a first ground profile of the first side wall arrangement; or
  - ii) in the first ground profile of the first side wall arrangement; or
  - iii) in a floor;
  - and/or
- b) a second lighting device, wherein the second lighting device is arranged:
  - i) on a second ground profile of the second side wall arrangement; or
  - ii) in the second ground profile of the second side wall arrangement; or
  - iii) in the floor.

3. The one-way passage system with a non-return barrier according to claim 2, wherein:
- the first side wall arrangement comprises at least one first glass pane, wherein the first ground profile supports the at least one first glass pane; and/or
- the second side wall arrangement comprises at least one second glass pane, wherein the second ground profile supports the at least one second glass pane.

4. The one-way passage system with a non-return barrier according to claim 2, wherein the first lighting device comprises:
- a) a plurality of LED strips, wherein each LED strip comprises a plurality of LEDs, and wherein each LED strip lights up in a different color and wherein at least one LED strip lights up in the selected color; or
- b) a multi-color LED strip, wherein the multi-color LED strip comprises a plurality of LEDs, and wherein the multi-color LED strip is controllable such that only LEDs of a particular color light up to illuminate the passageway with the selected color;
- and/or
- wherein the second lighting device comprises:
- a) a plurality of LED strips, wherein each LED strip comprises a plurality of LEDs, and wherein each LED strip lights up in a different color and wherein at least one LED strip lights up in the selected color; or
- b) a multi-color LED strip, wherein the multi-color LED strip comprises a plurality of LEDs, and wherein the multi-color LED strip is controllable such that only LEDs of a particular color light up to illuminate the passageway with the selected color.

5. The one-way passage system with a non-return barrier according to claim 4, wherein:

the first lighting device extends along the entire length of the passage area or along the predominant length of the passage area; and/or the second lighting device extends along the entire length of the passage area or along the predominant length of the passage area.

6. The one-way passage system with a non-return barrier according to claim 4, wherein:

the first ground profile comprises a first receiving groove, wherein the first lighting device is arranged in this first receiving groove; and/or the second ground profile comprises a second receiving groove, wherein the second lighting device is arranged in this second receiving groove.

7. The one-way passage system with a non-return barrier according to claim 4, wherein:

a first receiving groove is formed between the first ground profile and the floor, wherein the first lighting device is arranged in this first receiving groove; and/or a second receiving groove is formed between the second ground profile and the floor, wherein the second lighting device is arranged in this second receiving groove.

8. The one-way passage system with a non-return barrier according to claim 2, wherein the illumination device comprises:

a) a third lighting device, wherein the third lighting device is arranged:

i) on a first ceiling profile of the first side wall arrangement; or ii) in the first ceiling profile of the first side wall arrangement; or iii) in a ceiling arrangement;

and/or b) a fourth lighting device, wherein the fourth lighting device is arranged:

i) on a second ceiling profile of the second side wall arrangement; or ii) in the second ceiling profile of the second side wall arrangement; or iii) in the ceiling arrangement.

9. The one-way passage system with a non-return barrier according to claim 2, wherein the illumination device comprises:

a) a first entrance side light arrangement, wherein the first entrance side light arrangement is arranged on a first vertical profile of said entrance door arrangement; and/or b) a second entrance side light arrangement, wherein the second entrance side light arrangement is arranged on a second vertical profile of said entrance door arrangement; and/or c) a first exit side light arrangement, wherein the first exit side light arrangement is arranged on a first vertical profile of said exit door arrangement; and/or d) a second exit side light arrangement, wherein the second exit side light arrangement is arranged on a second vertical profile of said exit door arrangement.

10. The one-way passage system with a non-return barrier according to claim 1, wherein:

in the normal operating mode, the control device is configured to:

a) keep the entrance door arrangement and the exit door arrangement open at all times; or b) open the entrance door arrangement if an analysis of the sensor data of the sensor device shows that the person is approaching the entrance door arrangement and the control device is further configured to open the exit door arrangement if the analysis of the sensor data of the sensor device shows that the person is in the passage area;

and/or in the lock operating mode, the control device is configured to open the entrance door arrangement or the exit door arrangement only when the respective other door arrangement is completely closed.

11. The one-way passage system with a non-return barrier according to claim 1, wherein:

the control device is configured to set the selected color to red when the control device is in the safety operating mode or the restricted operating mode; and/or the control device is configured to set the selected color to green when the control device is in the normal operating mode or the lock operating mode; and/or the control device is configured to set the selected color to yellow when the control device is in the malfunction operating mode.

12. The one-way passage system with a non-return barrier according to claim 2, wherein:

the control device is configured to control the first lighting device and/or the second lighting device of the illumination device in the normal operating mode or in the lock operating mode in such a way that it produces a running light effect from the entrance door arrangement in the direction of the exit door arrangement.

13. The one-way passage system with a non-return barrier according to claim 2, wherein:

the control device is configured to control the first lighting device and/or the second lighting device of the illumination device in the malfunction operating mode such that they are switched on and off at predetermined intervals, thereby producing a flashing effect.

14. The one-way passage system with a non-return barrier according to claim 13, wherein:

switching off is done by successively increasing a dimming and switching on is done by successively decreasing a dimming.

15. The one-way passage system according to claim 1, wherein:

an entrance side visual signaling device is provided and arranged above the entrance door arrangement, wherein the control device is configured to control the entrance side visual signaling device to visually display an output signal corresponding to the operating mode of said control device; and/or an exit side visual signaling device is provided and arranged above the exit door arrangement, wherein the control device is configured to control the exit side visual signaling device to visually display an output signal corresponding to the operating mode of said control device.

16. The one-way passage system according to claim 1, further comprising:

a video surveillance system; and a display system; and a memory system; and wherein in the safety operating mode and/or in the malfunction operating mode, the control device is configured to control the video surveillance system in such a way that it records video signals:

a) of the passage area; and/or b) of an area in front of the entrance door arrangement; and/or c) of an area in front of the exit door arrangement;
and:
i) displays the video signal on the display system; and/or
ii) stores them in the memory system.

17. The one-way passage system according to claim 1, further comprising:
an intermediate door arrangement in the passage area between the entrance door arrangement and the exit door arrangement.

18. The one-way passage system according to claim 1, further comprising:
a barrier arrangement arranged after the exit door arrangement.

19. The one-way passage system according to claim 1, wherein the passage area comprises a curved or angular course.

20. A building with a one-way passage system according to claim 1, wherein the building comprises at least two rooms separated by at least one wall, the at least one wall having an opening in which the one-way passage system is installed, whereby persons can only pass from a first room to a second room.

* * * * *